United States Patent
Niemela et al.

(10) Patent No.: US 7,233,796 B2
(45) Date of Patent: Jun. 19, 2007

(54) OPTIMIZING DATA TRANSFER IN RADIO SYSTEM

(75) Inventors: Kari Niemela, Oulu (FI); Kari Pajukoski, Oulu (FI)

(73) Assignee: Nokia Corporation, Espoo (FI)

( * ) Notice: Subject to any disclaimer, the term of this patent is extended or adjusted under 35 U.S.C. 154(b) by 414 days.

(21) Appl. No.: 10/840,270

(22) Filed: May 7, 2004

(65) Prior Publication Data

US 2004/0209618 A1 Oct. 21, 2004

Related U.S. Application Data

(63) Continuation of application No. PCT/FI01/00997, filed on Nov. 16, 2001.

(30) Foreign Application Priority Data

May 7, 2003 (KR) ............................... 2003-28874

(51) Int. Cl.
*H04Q 7/20* (2006.01)
*H04B 7/00* (2006.01)
(52) U.S. Cl. ................ 455/445; 455/433; 455/522
(58) Field of Classification Search ................ 455/522, 455/433, 438, 525, 445; 370/331
See application file for complete search history.

(56) References Cited

U.S. PATENT DOCUMENTS 5,539,749 A * 7/1996 Eul ............................. 370/331
5,794,149 A * 8/1998 Hoo ............................ 455/438
5,867,791 A * 2/1999 Chambert .................... 455/525
6,104,933 A * 8/2000 Frodigh et al. ............. 455/522
2001/0005676 A1* 6/2001 Masuda et al. ............. 455/433

FOREIGN PATENT DOCUMENTS

| EP | 1 032 237 A1 | 8/2000 |
| EP | 1 071 305 A2 | 1/2001 |
| EP | 1 094 680 A1 | 4/2001 |

* cited by examiner

*Primary Examiner*—Joseph Feild
*Assistant Examiner*—Kiet Doan
(74) *Attorney, Agent, or Firm*—Squire, Sanders & Dempsey L.L.P.

(57) ABSTRACT

An arrangement for controlling transfer of information, comprising a radio system and a terminal equipment, which radio system comprises at least two base stations and is configured to set up simultaneous connections between the terminal equipment and at least two base stations, the terminal equipment being configured to measure properties of the connections between the terminal equipment and the base stations, and to select at least one of the base stations as a primary base station, information transfer between the primary base station and the terminal equipment being activated, and the radio system comprising a combining-splitting point, which is configured to carry out combining/splitting functions on information flows transmitted via connections set up over different physical transmission paths. The radio system is configured to restrict transfer of information between at least one secondary base station and the combining-splitting point, the terminal equipment having an inactive connection with the secondary base station.

28 Claims, 4 Drawing Sheets

OPTIMIZING DATA TRANSFER IN RADIO SYSTEM

Figure 1:
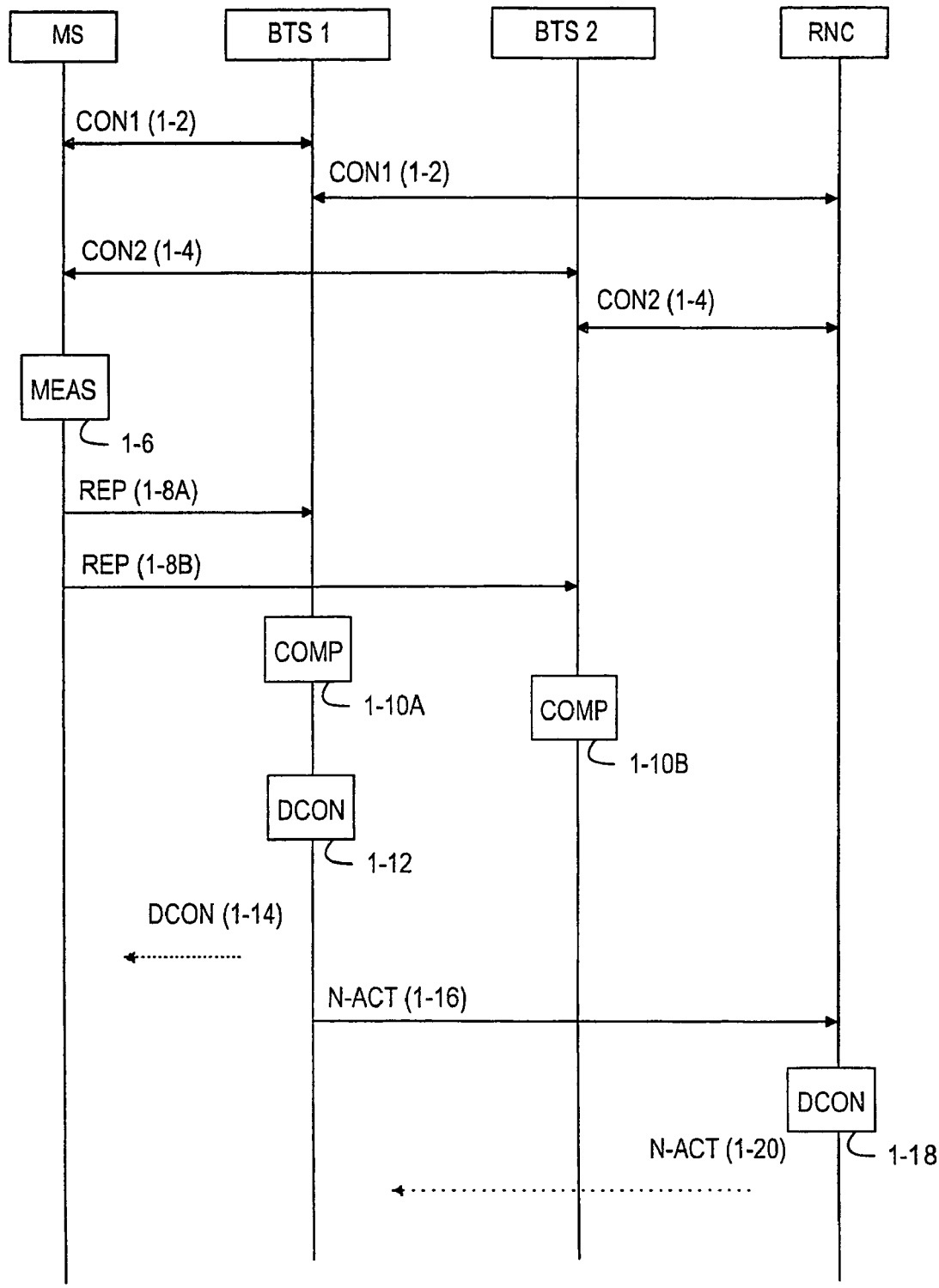

This is a Continuation of International Application No. PCT/FI01/00997 filed Nov. 16, 2001, which designated the U.S. and was published under PCT Article 21(2) in English.

FIELD

The invention relates to optimizing information transfer in a radio system. The invention relates particularly to restricting unnecessary information transfer during a soft handover.

BACKGROUND

A soft handover refers to a situation where a terminal equipment simultaneously utilizes radio resources of two or more base stations for transfer of information. These base stations are referred to as an active set of base stations. In addition to active base stations, the coverage area of a terminal equipment can also comprise passive base stations, which are not used for information transfer due to the lower field strength they provide. SSDT (Site Switching Diversity power control) is an embodiment of soft handover, where active base stations, with which a terminal equipment communicates, are divided into primary and secondary base stations. Transfer of information between the radio network, the base stations and the terminal equipment takes place via the primary base stations, whereas information transfer to the secondary base stations is blocked over the radio connection, excluding control channels. In an ESSDT (Enhanced SSDT) method, transfer of information to the secondary base stations is also blocked on the control channels.

Base stations are divided into primary and secondary base stations such that the terminal equipment measures quality characteristics of pilot signals transmitted by all the base stations of the active base station set with which it has set up a connection. The measurement result reported by the terminal equipment to the base stations consists for example of the identity of the base station providing the best signal quality. The base station compares the identity received from the terminal equipment to its own identity, and if the identities are identical, the base station allows information transfer over the radio link. When the identities do not match, the base station blocks the transmission of information. The base station also compares the quality of the received signal to a preset quality threshold. If the quality of the received signal does not exceed the quality threshold, transmission of information between the base station and the terminal equipment is allowed even though the received identity did not match the identity of the base station. Information transmitted over different physical channels and via different cells is forwarded to L2 protocol functions via a combining-splitting point of the radio network, which implements C/S (Combining/Splitting) functionality.

As is well known, the status of the radio link, i.e. either the primary or secondary status of the base station, does not affect information transfer between the base stations and the combining-splitting point, but information transfer is activated regardless of the base station status. A maximum time determined for a change of base stations for example in WCDMA (Wideband Code Division Multiple Access) standards is 10 ms, in which time a base station should be able to either activate or deactivate transfer of information over a downlink radio link on the basis of the measurement result.

A drawback of the prior art arrangements is that information transmission capacity is wasted between the combining-splitting point and the base stations if the primary/secondary status of the base stations is not taken into account.

BRIEF DESCRIPTION

An objective of the invention is to realize a method and an apparatus implementing the method so as to reduce unnecessary traffic between the combining-splitting point and the base stations during a soft handover. This is achieved by a method of controlling information transfer in a radio system, the method comprising setting up connections between a terminal equipment using the radio system and at least two transceivers of the system, measuring properties of the connections between the terminal equipment and the transceivers, selecting, based on the measurements of properties, at least one of the transceivers as a primary transceiver, information transfer being activated between the primary transceiver and the terminal equipment. The method comprises restricting at least partly the transfer of information between at least one secondary transceiver and a combining-splitting point of the radio system, information transfer being deactivated between the secondary transceiver and the terminal equipment.

The invention also relates to a method of optimizing information transfer in the downlink direction in a radio system, the method comprising setting up connections between a terminal equipment using the radio system and at least two transceivers of the system, measuring properties of the connections between the terminal equipment and the transceivers, selecting, based on the measurements of properties, at least one of the transceivers as a primary transceiver, information transfer being activated between the primary transceiver and the terminal equipment. The method comprises restricting at least partly the transfer of information from a combining-splitting point of the radio system to a secondary transceiver, information transfer being deactivated between the secondary transceiver and the terminal equipment.

The invention also relates to a method of optimizing information transfer in the uplink direction in a radio system, the method comprising setting up connections between a terminal equipment using the radio system and at least two transceivers of the system, measuring properties of the connections between the terminal equipment and the transceivers, selecting, based on the measurements of properties, at least one of the transceivers as a primary transceiver, information transfer being activated between the primary transceiver and the terminal equipment. The method comprises restricting at least partly the transfer of information from a secondary transceiver to a combining-splitting point of the radio system, information transfer being deactivated between the secondary transceiver and the terminal equipment.

The invention also relates to an arrangement for controlling information transfer, comprising a radio system and a terminal equipment using the radio system, the system comprising at least two transceivers and being configured to set up simultaneous connections between the terminal equipment and the at least two transceivers of the radio system, the terminal equipment being configured to measure properties of connections between the terminal equipment and the transceivers, and to select, based on the measurements of properties, at least one of the transceivers as a primary transceiver, information transfer between the primary transceiver and the terminal equipment being activated, and the radio system comprising a combining-splitting point, which is configured to carry out combining/splitting functions on information flows transmitted via connections set up over different physical transmission paths. The radio system is configured to restrict at least partly information transfer between at least one secondary transceiver and the combining-splitting point, the terminal equipment having an inactive connection with the secondary transceiver.

The invention also relates to a transceiver in a radio system, the transceiver being configured to set up a connection to a terminal equipment in the coverage area of the transceiver, and to receive information about one or more primary transceivers from the terminal equipment. The transceiver is configure to transmit the information about the primary transceiver to a combining-splitting point of the radio system in connection with the transceiver.

The invention further relates to a transceiver in a radio system, the transceiver being configured to set up a connection to a terminal equipment in the coverage area of the transceiver, and to receive information about one or more primary transceivers from the terminal equipment. The transceiver is configured to restrict the transmission of information from the transceiver to the combining-splitting point of the radio system in connection with the transceiver, if the information about the primary transceiver points at some other transceiver than the transceiver in question.

The preferred embodiments of the invention are disclosed in the dependent claims.

The invention thus relates to radio systems, such as mobile communication systems. An arrangement according to the invention can be implemented for example in the UMTS (Universal Mobile Telephony System) based on the WCDMA principle. The arrangement according to the invention can also be implemented for example in other radio systems utilizing soft or softer handover.

The invention relates to macrodiversity or soft handover situations, where a terminal equipment has a simultaneous connection with at least two transceivers. A transceiver is defined in the invention as a radio network element, which has a bi-directional radio link to a terminal equipment. Dedicated common channels or at least a dedicated pilot signal is allocated to the transceiver from the radio network. The transceiver is thus a radio network element, which constitutes a cell, a sector or an antenna beam/polarization, if the latter have been allocated dedicated common channels or at least a dedicated pilot signal. In connection with the description of the invention, a transceiver is generally referred to as a base station, but it is evident that one base station can comprise one or more transceivers. When it is stated in the description of the invention that at least two connections have been set up from a terminal equipment to transceivers, the transceivers can be located either at different base stations or at the same base station. Therefore the invention can also be applied in connection with a microdiversity or softer handover method. In a softer handover, a terminal equipment communicates with two sectors formed on the same base station site and receiving different pilot signals.

According to a first invention, transfer of information between a base station, or a transceiver, and a combining-splitting point, which is placed for example in a radio network controller, is restricted in so far as information transfer is blocked between the base station and the terminal equipment. With a primary base station with which the terminal equipment has a busy connection, the terminal equipment has an active data transfer connection where transmission of user data is possible. With a secondary base station the terminal equipment has a quiet connection, i.e. a connection has been set up, but transfer of information is blocked at least with respect to user data. In the invention, restricting the transmission of information between the base station and the combining-splitting point in turn means that the transfer of user data is substantially blocked, but for example signalling related to maintenance of the transmission connection may be continued. Restricting can be carried out in each data transmission direction or only in one direction. Restricting is preferably carried out in a part of the radio system that implements the C/S (Combining/Splitting) functionality. For example, uplink C/S functionality can be carried out by an MRC (Maximum Ratio Combining) method or based on signal quality or absence of a signal. The C/S functionality is preferably implemented in an MDC (Macro Diversity Combining/Splitting point), since this saves transmission capacity. The C/S functionality can be located for example in the UMTS in an SRNC (Service Radio Network Controller), DRNC (Drift Radio Network Controller) or Node B level.

According to a second invention, transfer of information is prevented at least partly in the downlink transmission direction between the combining-splitting point and a secondary base station. According to a third invention, transfer of information is prevented in the uplink direction between a secondary base station and the combining-splitting point. In such a case, only one or several primary radio links participate in the uplink power control, which provides a simpler manner to implement optimum power control.

The updating interval of the set of primary base stations is preferably increased from a standard 10 ms to at least 20 ms. This provides an advantage that a data transmission connection retains better quality in case of a fast fading channel when the channel quality estimation related to the selection of the primary base station is carried out over a longer period of time, thus avoiding error factors resulting from the fast fading. The updating interval can be preferably determined to an optimum value with respect to the quality of the radio channel and the location of the combining-splitting point.

The arrangement according to the invention provides an advantage that transfer of unnecessary information can be reduced in the radio system between the secondary transceivers and the combining-splitting point. The smaller amount of information to be transferred results in lower capacity needed and thus to savings in money.

LIST OF THE FIGURES

Figure 2:
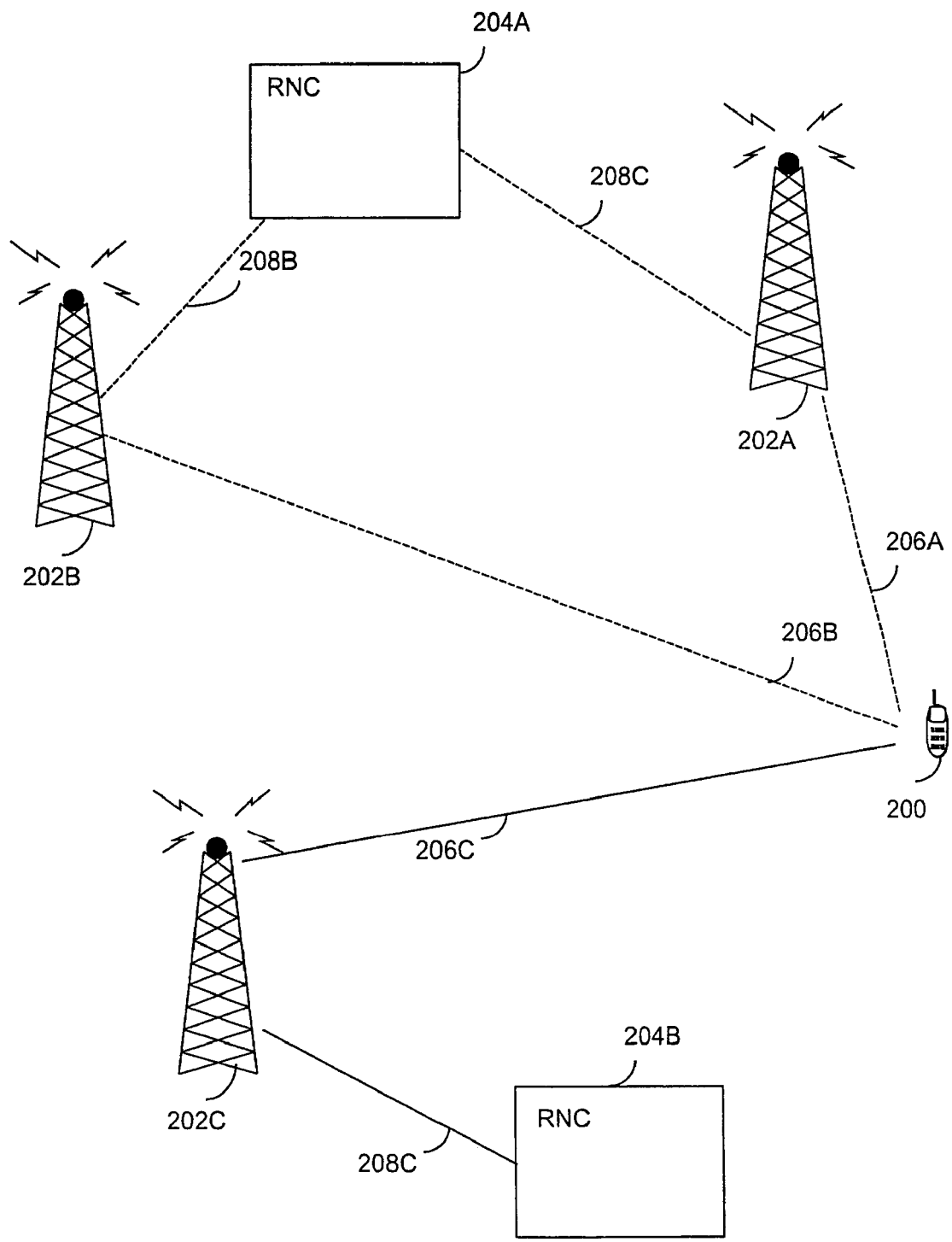
Figure 3:
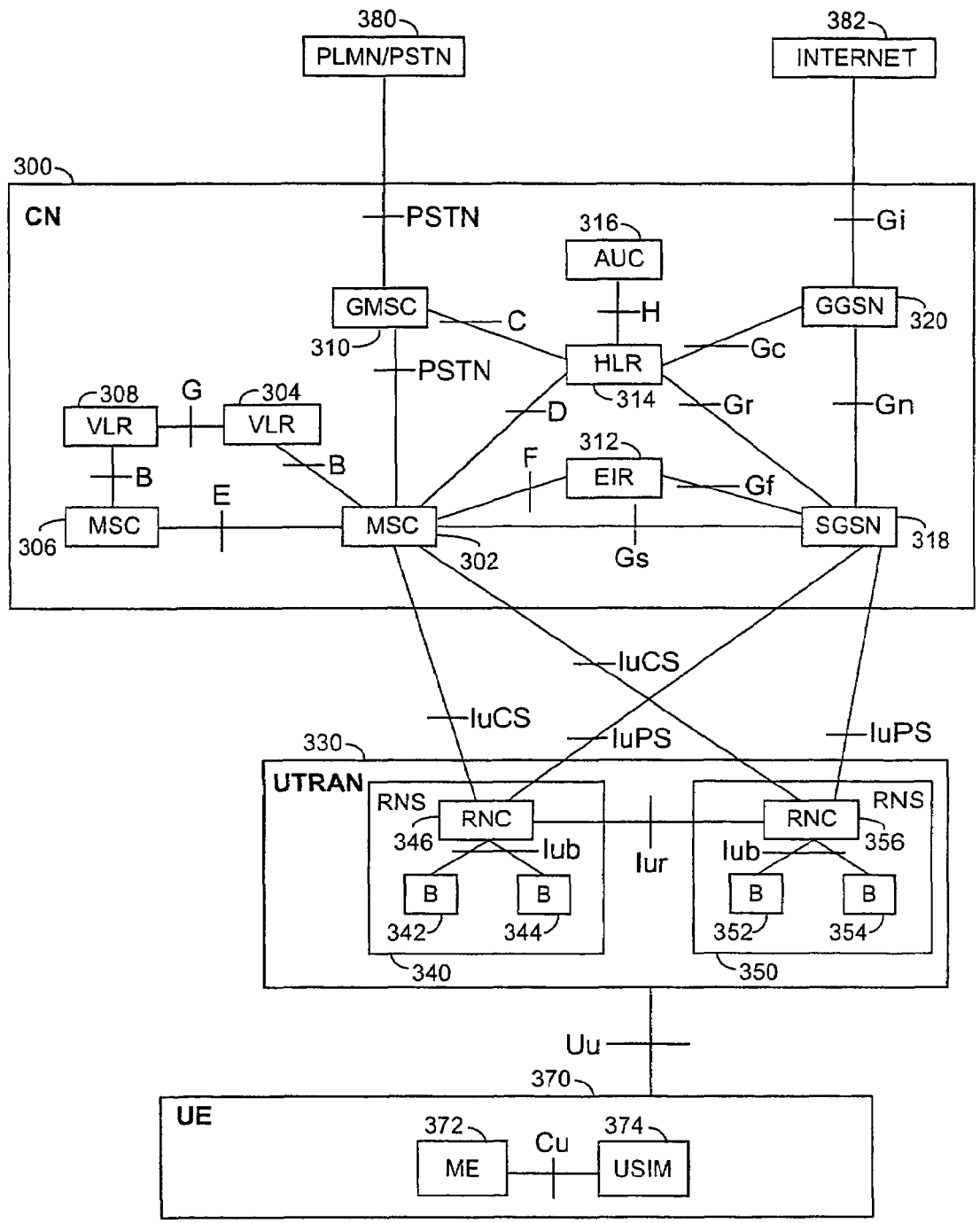
Figure 4:
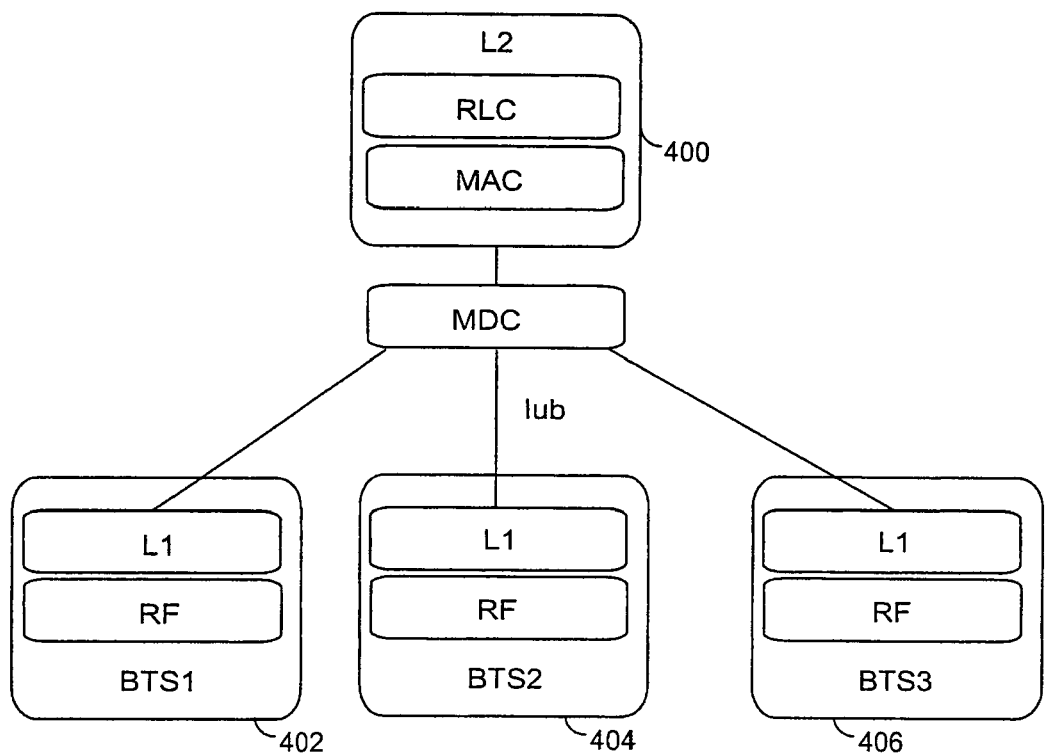
Figure 5:
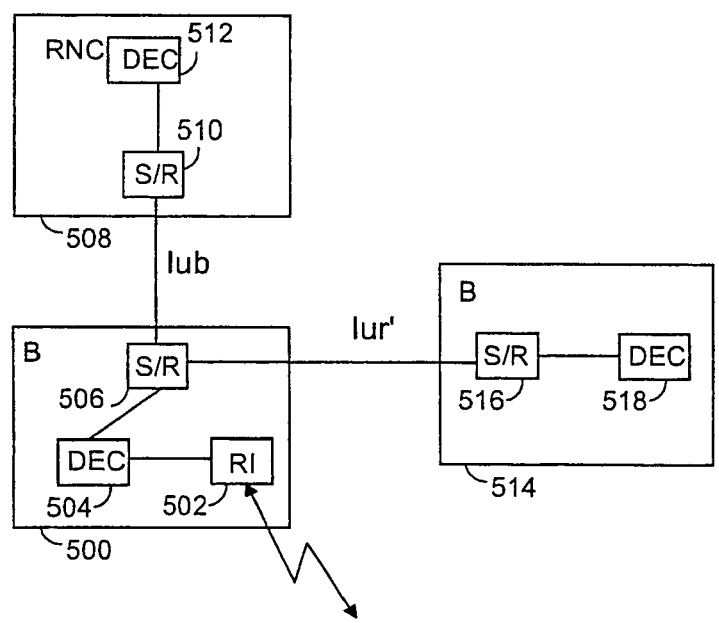

In the following, the invention will be described in greater detail in connection with preferred embodiments and with reference to the accompanying drawings, in which FIG. 1 shows a preferred embodiment of the method,
FIG. 2 shows an embodiment of the system,
FIG. 3 shows an embodiment of the system,
FIG. 4 illustrates a protocol stack of a radio interface,
FIG. 5 shows an embodiment of the system.

DESCRIPTION OF EMBODIMENTS

A preferred embodiment of the method will be described with reference to FIG. 1. Assume that a terminal equipment, such as a mobile phone, is located in coverage areas of two base stations BTS1 and BTS2 in a mobile telephone system. Method step 1-2A describes call set-up from the mobile station MS to the first base station BTS1. The call set-up includes a great deal of signalling between the terminal equipment and the base station, and functions to be carried out at each end of the radio link to be set up, but it is not essential for the present description to illustrate them in more detail. The important feature is that a radio link is established between the terminal equipment and the base station for possible communication. The call set-up between the terminal equipment and the mobile communication system also comprises corresponding call set-up functions between the base station and a radio network controller RNC controlling the base station, according to step 1-2B. As a result, in step 1-2B a data transfer connection is established between the base station and the radio network controller for transmitting information related to the communication of the terminal equipment MS.

Similarly as call set-up to base station BTS1 is described in step 1-2, in steps 1-4A and 1-4B a connection is established between the terminal equipment and base station BTS2, and base station BTS2 and the radio network controller RNC. Even though the example of FIG. 1 shows the base stations BTS1 and BTS2 being controlled by the same radio network controller, this is not necessarily the case but the base stations can also be controlled by different radio network controllers.

Method step 1-6 describes measurements carried out by the terminal equipment MS on the quality of connections to the base stations BTS1 and BTS2. The measurements can be based for example on path loss or signal-to-interference ratio (SIR). By means of the selected criterion, the terminal equipment MS informs the base stations BTS1 and BTS2 on the measurement results. In an embodiment, the terminal equipment MS transmits, in a measurement report, the base station identity of the base station it considers the best based on the quality measurements, as shown in steps 1-8A and 1-8B. The base station identity transmitted by the terminal equipment to the base stations can be not only the actual base station identity but for example also the identity of the pilot of the base station providing the best connection, and the pilot can be either a primary or a secondary pilot of the base station. Method steps 1-10A and 1-10B describe the functionality of the base stations, by means of which they compare the base station identity of the base station providing the best connection, received from the terminal equipment, to their own base station identity.

It is assumed in the example of FIG. 1 that the base station providing the best connection to the terminal equipment MS is base station BTS2, which thus continues transmission normally to the mobile station. At base station BTS, in turn, functionality 1-12 is carried out, which results in disconnection of traffic to the terminal equipment MS as indicated in step 1-14. Disconnection of traffic means herein that the transmission of user information is disconnected, but for example some of the control channels are still transmitted. Functionality 1-12 also includes preparing the information to be transmitted to the radio network controller about the base station having become a secondary base station for the terminal equipment. This information is transmitted in method step 1-16. The information transmitted in method step 1-16 to the radio network controller can be exactly the same information that the base station received from the terminal equipment, or the base station can change the form in which the information is displayed. The radio network controller MSC receives the information from the base station that has become a secondary base station and carries out functionality 1-18, which results in the disconnection of the data transfer connection to base station BTS1, as shown by a broken-line arrow 1-20.

FIG. 1 shows a soft handover, where a terminal equipment sets up a connection with two base stations. However, there can also be even more connections with which the terminal equipment can set up a connection during a soft handover. For example in the UMTS, a terminal equipment can communicate simultaneously with seven base stations. It is also possible that the set of base stations that are primary for the terminal equipment includes more than one base station of the active set. FIG. 1 shows that functionality 1-18 for terminating a connection is carried out in the radio network controller RNC. The RNC is only shown herein as an example, and more generally, functionality 1-18 can be located in a data link layer L2 of a radio interface. For example in the UMTS, the functionality is preferably carried out in the MDC, the location of which in the network can be selected optimally without being restricted to the RNC; for example, it can be situated closer to the base stations, or in a decentralized arrangement at the base stations. Furthermore, the arrangement is independent of the transmission network, which means that it is applicable to networks utilizing AAL2/ATM or UDP/IP transmission arrangements. In the All IP RAN (Internet Protocol Radio Access Network) architecture, part of the L2 functionality is placed at the base station level, in which case functionalities 1-16 and 1-18 shown in FIG. 1 would be carried out in full at the base station. It is essential that the functionality described in FIG. 1 results in optimizing for example IP-based and ATM-based (Asynchronous Transfer Mode) communication between levels L1 and L2 of the radio interface.

FIG. 1 illustrates the arrangement only in the downlink direction. A corresponding arrangement is possible also in the uplink direction. A functionality is thus carried out at the base stations BTS1 and BTS2, so that when the base station receives a report 1-8A/B from the terminal equipment MS, it also deduces in function 1-10A/B whether information should be transmitted over the L1-L2 interface. Assume that base station BTS1 is the primary base station of the terminal equipment. However, from the next measurement report base station BTS1 detects that it is no longer the primary base station of the terminal equipment, whereafter it prevents the transfer of unnecessary information over the interface L1-L2. For example in the UMTS, the interface L1-L2 refers to an Iub interface or an Iur interface.

FIG. 2 illustrates a preferred embodiment of the system with regard to equipment. The figure shows a mobile station 200, which has set up connections 206A to 206C to base stations 202A to 202C, respectively. Base station 206C is the primary base station of the terminal equipment, which is illustrated by a continuous line. Base stations 202A and 202B are secondary base stations, which is illustrated by a broken line. The status of the connections between the base stations and the radio network controllers controlling them is shown similarly, i.e. transfer of information is activated over connection 208C but deactivated over connections 208A and 208B.

The general structure of the radio system will be described below with reference to the UMTS shown in FIG. 3, which is a third-generation mobile communication system based on wideband code division multiple access (WCDMA). However, the embodiments are not restricted to the UMTS, but those skilled in the art can also apply these methods in other radio systems with similar properties. FIG. 3 is a simplified block diagram, which shows the central elements of the radio system and the interconnecting interfaces at the level of network elements. The structure and functions of the network elements are not described in detail since they are known per se. The main parts of the radio system comprise a core network (CN) 300, a UTRAN (UMTS Terrestrial Radio Access Network) 330, and a user equipment (UE) 370.

The core network 300 comprises a mobile services switching centre (MSC) 302, which is the centre of the circuit switching side of the core network 300. The functions of the MSC 302 include switching, paging, location registration, handover management, gathering subscriber billing information, data encryption parameter management, frequency allocation management, and echo cancellation. The number of MSCs 302 can vary: a small network operator can have only one MSC 302, but large core networks 300 can have several MSCs. FIG. 3 shows a second mobile services switching centre 306, but the connections therefrom to the other network elements are not shown for the sake of clarity of the figure.

Large core networks 300 can comprise a separate gateway mobile services switching centre (GMSC) 310, which manages circuit-switched connections between the core network 300 and external networks 380. The GMSC 310 is located between the MSCs 302, 306 and the external networks 380. An external network 380 can be for example a public land mobile network (PLMN) or a public switched telephone network (PSTN).

A home location register (HLR) 314 comprises a permanent subscriber register, i.e. for example the following information: an international mobile subscriber identity (IMSI), a mobile subscriber ISDN number (MSISDN), an authentication key, and a packet data protocol (PDP) address, if the radio system supports the GPRS. A visitor location register (VLR) 304 comprises roaming information about user equipments 370 in the area of the MSC 302. The VLR 304 comprises largely the same information as the HLR 314, but the information is stored in the VLR 304 only temporarily. An equipment identity register (EIR) 312 comprises international mobile equipment identities (IMEI) of the user equipments 370 used in the radio system, and a 'white' list, and possibly a 'black' and a 'grey' list. An authentication centre (AuC) 316 is always located physically in the same place as the HLR 314, and it comprises a subscriber authentication key (Ki) and a corresponding IMSI.

A serving GPRS support node (SGSN) 318 is the centre of the packet switching side in the core network 300. The main function of the SGSN 318 is to transmit and receive packets with a user equipment 370 supporting packet switched transmission. A gateway GPRS support node (GGSN) 320 is an element in the packet switching side that corresponds to the GMSC 310 in the circuit switching side, but the difference is that the GGSN 320 must also be able to route traffic that is directed from the core network 300 to external networks 382, whereas the GMSC 310 only routes incoming traffic. In this example, the Internet represents the external networks 382.

A UTRAN 330 consists of radio network subsystems 340, 350. Each radio network subsystem 340, 350 consists of radio network controllers RNC 346, 356 and nodes B 342, 344, 352, 354. Node B refers in practice to a base station site or a base station cabinet. One node B can thus comprise several base stations, and the coverage area of one node B can include several cells, each of which has its own common channels. The functionality of the RNC 340, 350 corresponds approximately to a base station controller in the second-generation GSM (Global System for Mobile Communications). The radio network controller can be referred to as a controlling RNC (CRNC), which means a radio network controller that controls one base station. The CRNC is responsible for base station loading and congestion control. If the terminal equipment utilizes resources of more than one RNS, the functions of the RNC can be distributed either to a serving RNC (SRNC) or a drift RNC (DRNC). The SRNC operates as a point of terminating signalling between the terminal equipment 370 and the UTRAN, and it carries out L2 processing on the data to be transmitted/received. The SRNC also executes a handover. The DRNC is an RNC that is other than the SRNC and that controls the cells the terminal equipment uses. The DRNC can perform macrodiversity-related combining and splitting. The DRNC does not perform L2 processing, but it transmits the data directly between the Iub and Iur interfaces, except in situations where the terminal equipment uses a shared channel. A terminal equipment can comprise zero, one or several DRNCs. With regard to the actual implementation, one RNC comprises CRNC, SRNC and DRNC functionalities.

A user equipment 370 consists of two parts: a mobile equipment (ME) 372 and a UMTS subscriber identity module (USIM) 374. The terminal equipment or user equipment 370 comprises at least one transceiver, which implements a radio link to the UTRAN 330 or to the base station system 360. The user equipment 370 can comprise at least two different subscriber identity modules. The user equipment 370 also comprises an antenna, a user interface and a battery. The USIM 374 contains information related to the user and particularly to information security, such as an encryption algorithm.

FIG. 3 also shows interfaces between different network elements. Examples of interfaces include interface Iub between the base station 342, 344, 352, 354 and the radio network controller 346, 356 that controls the base station, and interface Iur between the radio network controllers 346 and 356.

A delay between the selection of a primary base station and the activation of a transmitter can be referred to as a cell switch round trip time. The example disclosed below describes the different components of a cell switch round trip time in an embodiment. It is assumed in this embodiment that the MDC is located in the data link layer, for example in the RNC, in which case the calculation of the cell switch round trip time also includes signalling over an Iub or an Iur interface. In the table below, UL refers to the uplink direction and DL refers to the downlink direction. If the combining-splitting point were located at level L1, the calculation of the cell switch round trip time would not require the inclusion of Iub/Iur transfer times, whereupon the round trip time would be less than 10 ms. The round trip time can also be adjusted in the system in order to improve system capacity. The round trip time can also be signalled to the terminal equipment.

| | |
|---|---|
| UL signalling time over radio interface | 10 ms |
| L1 UL processing time | 2 ms |
| Iub/Iur UL transfer time | 13 ms |
| MDC processing time | 1 ms |
| Iub/Iur DL transfer time | 13 ms |
| L1 DL processing time | 1 ms |
| Total switching time | 40 ms |

FIG. 4 illustrates a protocol stack of a radio interface. The figure shows a data link layer 400 of the radio interface, and three physical layers 402 to 406, each of which is located at a respective base station BTS1 to BTS3. In the downlink direction, the functionality of restricting information transfer is preferably carried out at the L2 MDC protocol level. The location of the MDC in protocol stack L1 or L2 is not specified, but the MDC can also be located elsewhere than between the channel coding and the MAC level. Correspondingly in the uplink direction, restriction of information transfer can be carried out in the L1 layer realized at the base station. Restricting UL information transfer and restricting DL information transfer are mutually independent between protocol levels L1 and L2. It may thus be possible that the downlink communication is active from level L2 400 to all L1 elements 402 to 406, but for example in the uplink direction communication is only possible from element 404.

FIG. 5 shows an embodiment of the arrangement and the base station. The figure shows a base station 500, which has set up a unidirectional or bidirectional connection via a radio interface element 502 with the terminal equipments located in its coverage area. The information received at the base station is guided to decision-making means 504. The decision-making means 504 are configured to decide, based on the information received from the terminal equipment, whether communication to the terminal equipment should be continued via the base station in question. The information received from the terminal equipment can consist of for example a base station identity, which the base station compares to its own identity. If the identities are identical, the base station continues transmission and/or reception of information. The decision-making means are also configured to decide whether the information received from the terminal equipment is to be transmitted to the combining-splitting point. Decisions are made for example such that the information is transmitted to the higher protocol layers only if the base station is converted from a primary into a secondary base station, or vice versa. If the measurement report received from the terminal equipment indicates that no change occurs in the base station status, the base station preferably transmits nothing in the uplink direction via the transceiver 506. In the radio network controller 508, the transceiver 510 is configured to transmit and receive information related to activation or deactivation of the Iub interface with respect to the base station. The radio network controller 508 also comprises decision-making means 512 configured to make a decision on whether information is to be transmitted in the downlink direction to the base station. FIG. 5 also shows a base station B 514 of the IPRAN, which has an L1-L2 interface Iur' from the base station 500. Similarly as the radio network controller, the base station 514 also comprises the functionality of a transceiver 516, and decision-making means 518. The devices according to the above-described embodiments at the base station and in the radio network, and the functionalities required by the methods according to the preferred embodiments are carried out for example by means of software, ASICs (Application Specific Integrated Circuit) or separate logic components.

Even though the invention is described above with reference to the example according to the accompanying drawings, it is clear that the invention is not restricted thereto, but it can be modified in several manners within the scope of the inventive idea disclosed in the appended claims.

The invention claimed is:

1. A method of controlling information transfer in a radio system, the method comprising:
    setting up connections between a terminal equipment using the radio system and at least two transceivers of the system; measuring properties of the connections between the terminal equipment and the transceivers; selecting, based on the measurements of properties, at least one of the transceivers as a primary transceiver, information transfer being activated between the primary transceiver and the terminal equipment;
    restricting at least partly the transfer of information between at least one secondary transceiver and a combining-splitting point of the radio system;
    deactivating information transfer between the secondary transceiver and the terminal equipment;
    maintaining a connection between the secondary transceiver and the terminal equipment.

2. A method of optimizing information transfer in the downlink direction in a radio system, the method comprising:
    setting up connections between a terminal equipment using the radio system and at least two transceivers of the system;
    measuring properties of the connections between the terminal equipment and the transceivers;
    selecting, based on the measurements of properties, at least one of the transceivers as a primary transceiver, information transfer being activated between the primary transceiver and the terminal equipment;
    restricting at least partly the transfer of information from a combining-splitting point of the radio system to a secondary transceiver;
    deactivating information transfer between the secondary transceiver and the terminal equipment;
    maintaining a connection between the secondary transceiver and the terminal equipment.

3. A method of optimizing information transfer in the uplink direction in a radio system, the method comprising:
    setting up connections between a terminal equipment using the radio system and at least two transceivers of the system;
    measuring properties of the connections between the terminal equipment and the transceivers;
    selecting, based on the measurements of properties, at least one of the transceivers as a primary transceiver, information transfer being activated between the primary transceiver and the terminal equipment;
    restricting at least partly the transfer of information from a secondary transceiver to a combining-splitting point of the radio system, information transfer being deactivated between the secondary transceiver and the terminal equipment,
    maintaining a connection between the secondary transceiver and the terminal equipment.

4. A method according to claim 1 or 3, wherein:
    receiving, in a transceiver, information associated with one or more primary transceivers from the terminal equipment;
    restricting the transfer of information from the transceiver to the combining-splitting point if the information about the primary transceiver indicates that the primary transceiver is other than the transceiver in question.

5. A method according to claim 1 or 2, wherein:
    receiving, in a transceiver, information associated with one or more primary transceivers from the terminal equipment;
    transmitting the information about the primary transceiver to the combining-splitting point; and
    restricting, in the combining-splitting point, the transfer of information in the downlink direction between the combining-splitting point and at least one secondary transceiver.

6. A method according to claim 1 or 2, wherein:
receiving, in a transceiver, information associated with one or more primary transceivers from the terminal equipment,
transmitting the information associated with the primary transceiver from the transceiver to the combining-splitting point, if a comparison indicates that the transceiver was previously a secondary transceiver; and
restricting, in the combining-splitting point, the transfer of information in the downlink direction between the combining-splitting point and at least one secondary transceiver.

7. A method according to claim 1, 2 or 3, wherein:
measuring one or more of the following variables in the terminal equipment in the measurement of properties of the connections between the terminal equipment and the transceivers: attenuation of a signal transmitted from a transceiver, signal-to-interference ratio, and power of reception of a signal transmitted from the transceiver,
selecting, based on the measurement of properties, at least one transceiver in the terminal equipment as the primary transceiver,
transmitting the information about the at least one primary transceiver to the transceivers with which the terminal equipment has set up a connection.

8. A method according to claim 1, 2 or 3, wherein using the method in connection with a macrodiversity method.

9. A method according to claim 1, 2 or 3, wherein the combining-splitting point is a macrodiversity combining/splitting point (MDC).

10. A method according to claim 1 or 2, wherein restricting information transfer to a secondary transceiver in the downlink direction in a data link layer of a radio interface that defines the connection.

11. A method according to claim 1 or 3, wherein restricting information transfer in the uplink direction in a physical layer of a radio interface that defines the connection.

12. A method according to claim 1, 2 or 3, wherein selecting the location of the combining-splitting point in the network depending on one or more of the following: the quality of the connection between the terminal equipment and the transceiver, the mobility status of the terminal equipment, and the properties of the connection between the transceiver and the terminal equipment.

13. A method according to claim 1, 2 or 3, wherein the combining-splitting point is a microdiversity combining-splitting point.

14. An arrangement for controlling information transfer configured to:
set up simultaneous connections between a terminal equipment and the at least two transceivers of the radio system, the terminal equipment being configured to measure properties of connections between the terminal equipment and the transceivers;
select, based on the measurements of properties, at least one of the transceivers as a primary transceiver, information transfer between the primary transceiver and the terminal equipment being activated; and
the radio system comprising a combining-splitting point, which is configured to carry out combining/splitting functions on information flows transmitted via connections set up over different physical transmission paths,
wherein the radio system is configured to restrict at least partly transfer of information between at least one secondary transceiver and the combining-splitting point, the terminal equipment having an inactive connection with the secondary transceiver,
and wherein the arrangement is further configured to maintain a connection between the secondary transceiver and the terminal equipment,
wherein radio transfer is controlled in a radio system and a terminal equipment using the radio system, wherein the system comprising at least two transceivers.

15. An arrangement according to claim 14, wherein the combining-splitting point is configured to restrict at least partly the transfer of information from the combining-splitting point to the secondary transceiver, with which the transceiver has an inactive connection.

16. An arrangement according to claim 15, wherein the transceiver is configured to:
receive information associated with one or more primary transceivers from the terminal equipment; and
restrict the uplink transmission of information between the transceiver and the combining-splitting point, if the received information associated with the primary transceiver indicates that the transceiver is some other transceiver.

17. An arrangement according to claim 15, wherein the radio system is configured to select the location of the combining-splitting point in the network depending on one or more of the following: the quality of the connection between the terminal equipment and a transceiver, mobility status of the terminal equipment, and properties of the connection between the transceiver and the terminal equipment.

18. An arrangement according to claim 14, wherein the secondary transceiver, with which the terminal equipment has an inactive connection, is configured to restrict at least partly the transfer of information from the secondary transceiver to the combining-splitting point.

19. An arrangement according to claim 14, wherein the transceiver is configured to:
receive information associated with one or more primary transceivers from the terminal equipment; and
transmit the information about the primary transceiver to the combining-splitting point, which is configured to restrict the downlink transmission of information between the combining-splitting point and at least one secondary transceiver.

20. An arrangement according to claim 14, wherein the combining-splitting point is a macrodiversity combining/splitting point (MDC).

21. An arrangement according to claim 14, wherein the combining-splitting point is a microdiversity combining-splitting point.

22. An arrangement according to claim 14, wherein the combining-splitting point is arranged to restrict transfer of information to the secondary transceiver in the downlink direction in a data link layer of a radio interface that defines the connection.

23. An arrangement according to claim 14, wherein the transceiver is arranged to restrict uplink transmission of information in a physical layer of a radio interface that defines the connection.

24. A transceiver in a radio system, the transceiver being configured to:
set up a connection to a terminal equipment in the coverage area of the transceiver, and to
receive information associated with one or more primary transceivers from the terminal equipment, wherein the transceiver is configured to restrict the transmission of information from the transceiver to the combining-splitting point of the radio system in connection with the transceiver, if the information about the primary transceiver points at some other transceiver than the transceiver in question, wherein a connection between the transceiver and the terminal equipment is maintained.

25. A transceiver according to claim 24, wherein the transceiver is configured to:

receive information about one or more primary transceivers from the terminal equipment; and transmit the information about the primary transceiver to the combining-splitting point, if the information about the primary transceiver indicates that the transceiver is a primary transceiver and if the transceiver used to be a secondary transceiver.

26. A transceiver according to claim 24, wherein the transceiver is configured to restrict uplink transmission of information in a physical layer of a radio interface that defines the connection.

27. A transceiver according to claim 24, wherein the combining-splitting point is a macrodiversity combining/splitting point (MDC).

28. An apparatus in a radio system, the apparatus comprising:

connecting means for setting up a connection to a terminal equipment in the coverage area of the transceiver;

a receiving means for receiving information associated with one or more primary transceivers from the terminal equipment; and a transceiving means for restricting the transmission of information from the transceiver to the combining-splitting point of the radio system in connection with the transceiver, if the information about the primary transceiver points at some other transceiver than the transceiver in question a connection means for maintaining a connection between the transceiver and the terminal equipment.

* * * * *

UNITED STATES PATENT AND TRADEMARK OFFICE
CERTIFICATE OF CORRECTION

PATENT NO. : 7,233,796 B2  Page 1 of 1
APPLICATION NO. : 10/840270
DATED : June 19, 2007
INVENTOR(S) : Kari Niemela et al.

It is certified that error appears in the above-identified patent and that said Letters Patent is hereby corrected as shown below:

On the Title Page of the Patent

Item (30):    deleted in its entirety

~~(30) Foreign Application Priority Data~~

~~May 7, 2003    (KR)    2003-28874~~

Signed and Sealed this

Twelfth Day of February, 2008

JON W. DUDAS
*Director of the United States Patent and Trademark Office*